United States Patent [19]
Maus et al.

[11] Patent Number: 5,887,427
[45] Date of Patent: Mar. 30, 1999

[54] ELECTRICALLY INSULATING GAS TIGHT PENETRATION

[75] Inventors: Wolfgang Maus; Rolf Brück, both of Bergisch Gladbach; Carsten Kruse, Lohmar, all of Germany

[73] Assignee: Emitec Gesellschaft fuer Emissionstechnologie mbH, Lohmar, Germany

[21] Appl. No.: 986,368

[22] Filed: Dec. 8, 1997

Related U.S. Application Data

[63] Continuation of PCT/EP96/01735, Apr. 25, 1996.

[30] Foreign Application Priority Data

Jun. 7, 1995 [DE] Germany ............ 195 20 758.0

[51] Int. Cl.[6] ............ H01B 17/30; H05B 3/08; F01N 3/10
[52] U.S. Cl. ............ 60/300; 219/541; 422/174
[58] Field of Search ............ 60/300, 303; 422/174; 219/205, 541

[56] References Cited

U.S. PATENT DOCUMENTS

| | | | |
|---|---|---|---|
| 4,922,082 | 5/1990 | Bredt et al. | 219/541 |
| 5,177,961 | 1/1993 | Whittenberger | 60/300 |
| 5,238,650 | 8/1993 | Sheller et al. | 219/541 X |
| 5,318,756 | 6/1994 | Sheller et al. | 422/174 |
| 5,571,485 | 11/1996 | Brunson | 422/174 |
| 5,618,462 | 4/1997 | Swars | 219/541 |
| 5,670,746 | 9/1997 | Hashimoto et al. | 422/174 X |
| 5,749,223 | 5/1998 | Kreucher et al. | 60/300 |

*Primary Examiner*—John E. Ryznic
*Attorney, Agent, or Firm*—Herbert L. Lerner; Laurence A. Greenberg

[57] ABSTRACT

An electrically insulating gas-tight penetration is provided for at least two electrical conductors passing through a metal shell of an exhaust system of an internal combustion engine, in particular a metal shell of an electrically heatable catalytic converter. The shell has a sheath in the region of the penetration and the conductors extend through the sheath. Electromagnetic impulses are avoided by running the conductors coaxially to one another.

11 Claims, 1 Drawing Sheet

5,887,427

ELECTRICALLY INSULATING GAS TIGHT PENETRATION

CROSS-REFERENCE TO RELATED APPLICATION

This application is a continuation of International Application Serial No. PCT/EP96/01735, filed Apr. 25, 1996.

BACKGROUND OF THE INVENTION

FIELD OF THE INVENTION

The present invention refers to an electrically insulating gas-tight penetration of at least two electrical conductors passing through a metal shell of an exhaust system of an internal combustion engine, in particular a metal shell of an electrically heatable catalytic converter.

Prior art electrically insulating gas-tight penetrations are known in large numbers for the most varied uses.

Due to the consequences resulting from atmospheric pollution, stricter and stricter regulations are being issued to limit exhaust emissions, in particular from motor vehicles. As the demands for the reduction of pollutants in exhausts from vehicles increase, more and more complex systems for exhaust cleaning are being used for internal combustion engines. In particular, electrically heated catalytic converters are being used alongside a three-way catalytic converter for the reduction of pollutant emissions during the cold starting phase of an internal combustion engine. Such a configuration is known, for instance, from International Application WO 92/02714, corresponding to U.S. Pat. No. 5,411,711. The problem with such electrically heated catalytic converters is the electrical penetration of an electrical conductor of a voltage source into the electrically heated catalytic converter. A proposed solution for an electrical penetration is known from International Application WO 94/18442. International Application WO 94/18442 suggests constructing the electrically insulating gas-tight penetration in such a way that it is divided into two sections lying one behind the other. The first section thereof, lying closer to the exhaust system, is constructed to be electrically insulating and temperature-resistant but not quite gas-tight, whereas the second section lying farther away from the exhaust system is constructed as a gas-tight and electrically insulating penetration for lower temperatures. In that known penetration, two electrical conductors pass through the shell adjacent one another.

SUMMARY OF THE INVENTION

It is accordingly an object of the invention to provide an electrically insulating gas-tight penetration, which overcomes the hereinafore-mentioned disadvantages of the heretofore-known devices of this general type, which is capable of being manufactured economically and which provides a simple way of connecting electrical conductors.

With the foregoing and other objects in view there is provided, in accordance with the invention, in an internal combustion engine exhaust system having a metal shell, particularly of an electrically heatable catalytic converter, an electrically insulating gas-tight penetration passing through the shell at a given region, the penetration comprising a sheath passing through the shell in the given region; and at least two mutually coaxial electrical conductors extending through the sheath.

As a result of this construction of the penetration, only one single connection to the electrically heatable catalytic converter is needed for current supply. A coaxial cable can be used as a connector, so that a reduction of electromagnetic impulses is achieved. Moreover, the space required is less. A further advantage of the coaxial penetration is considered to be the fact that it can be fitted to corresponding connections or structures of the catalytic converter with the known methods of bolt welding.

In accordance with another feature of the invention, the conductors are mutually concentric.

In accordance with a further feature of the invention, the sheath has ends, each of the conductors has a section extending out of at least one of the ends, the section of each of the conductors is partially electrically insulated, the conductors have an inside and an outside, and the section of each of the conductors has a shorter length at the outside than at the inside.

In accordance with an added feature of the invention, the insulating material is a compressed powder mixture of magnesium oxide and/or aluminium oxide ($Al_2O_3$). The gas-tightness is achieved by sealing at least one surface of the penetration.

In accordance with an additional feature of the invention, glass is used as the sealing material for the gas-tight construction of the penetration. Enamel may also be used as a sealing material.

The glass or enamel sealing material can advantageously be used for a gas-tight construction of a penetration of at least two electrical conductors through a metal shell of an exhaust system of an internal combustion engine, in particular of an electrically heatable catalytic converter, in which the shell has a sheath in the region of the penetration through which the conductors extend and are disposed adjacent one another rather than coaxially. The sealing material has such a high melting point that the seal can be placed in immediate proximity to the converter.

In accordance with yet another feature of the invention, plasma injected aluminium oxide is used for the gas-tight sealing of the penetration and the electrical insulation, in order to reduce the manufacturing input. In this way, both electrical insulation and gas-tightness can be achieved in one manufacturing step.

In accordance with yet a further feature of the invention, a ceramic casting mass is used which achieves the same advantages as plasma-injected aluminium oxide.

In accordance with a concomitant feature of the invention, the given region of the shell is a region of low exhaust system temperature.

Other features which are considered as characteristic for the invention are set forth in the appended claims.

Although the invention is illustrated and described herein as embodied in an electrically insulating gas-tight penetration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
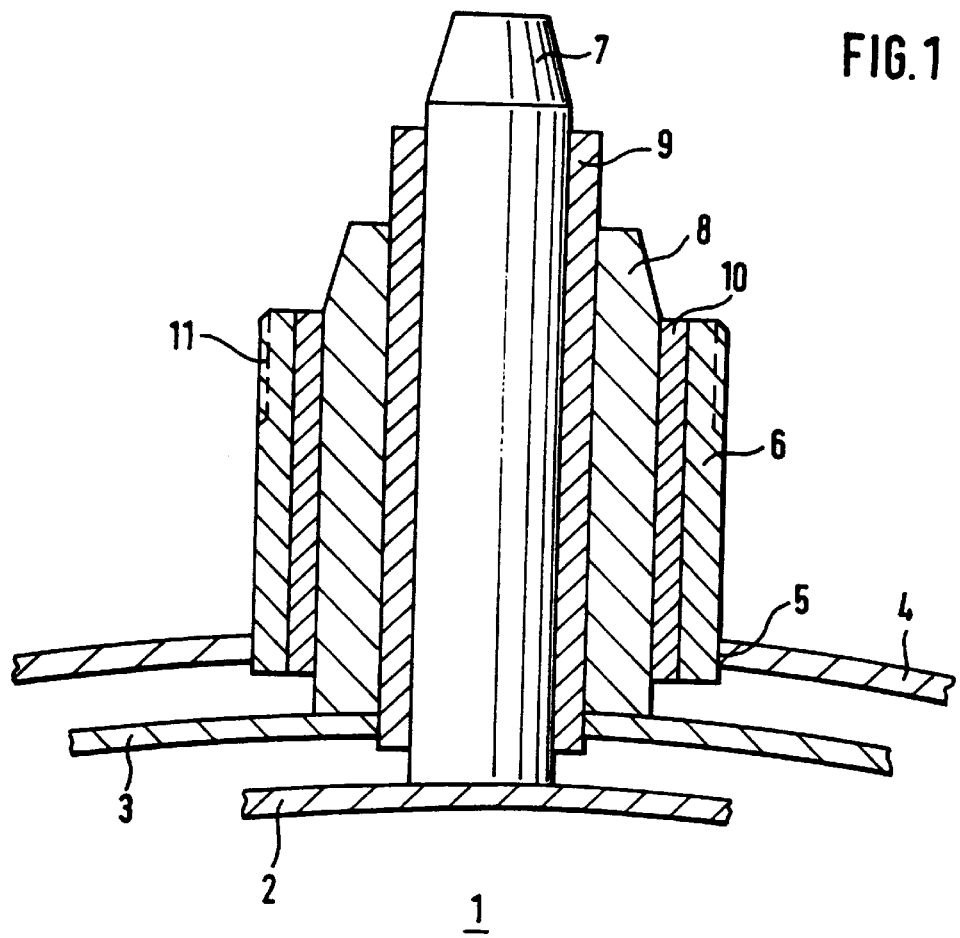
FIG. 1 is a fragmentary, diagrammatic, cross-sectional view of a penetration in an electrically heatable honeycomb body.
Figure 2:
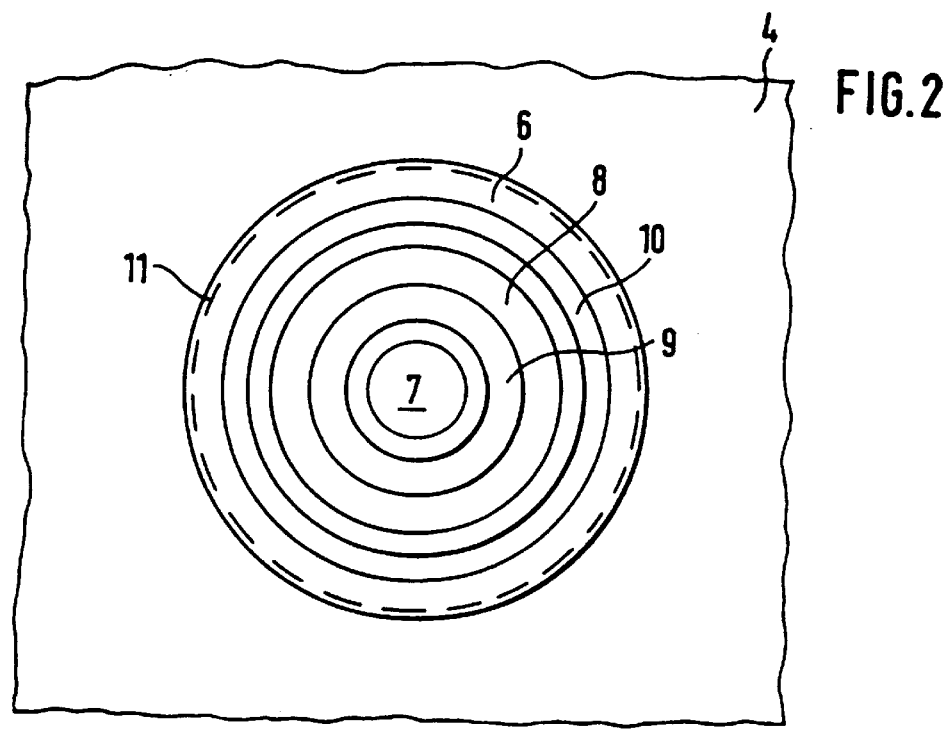
FIG. 2 is a fragmentary, top-plan view of the penetration according to FIG. 1.

Referring now to FIGS. 1 and 2 of the drawings in detail, there is seen a diagrammatic representation of an internal structure of an electrically heatable honeycomb body 1 in an exhaust system. Electrically conducting structures 2, 3 are situated in the honeycomb body 1 for feeding in electrical current. The electrically conductive structures can be at least partially structured metal sheets. The structure of such a honeycomb body is described, for instance, in International Application WO 92/02714, corresponding to U.S. Pat. No. 5,411,711. The exhaust system is enclosed in a jacket or shell 4. The shell 4 may be a one-piece tubular-shaped casing or housing. The shell 4 can also be formed of two shells. A sheath 6 protrudes into a penetration aperture 5 formed in the shell 4. The sheath 6 may be connected materially with the shell 4, in particular by welding or soldering. As can be seen from the drawing, the sheath 6 protrudes partially into the honeycomb body 1. The sheath 6 may also be flush with an inner surface of the shell 4.

Two electrical conductors 7, 8 are disposed coaxially to one another inside the sheath 6. The conductors 7, 8 ate electrically insulated from one another by an electrical insulation formed by an insulation layer 9. The insulation layer 9 can be plasma injected aluminium oxide ($Al_2O_3$). The outer tubular shaped conductor 8 is electrically insulated from the sheath 6 through the use of an insulating layer 10.

An end of the centrally positioned conductor 7 protruding into the honeycomb body is connected to the structure 2. In the same way, an end region of the conductor 8, which is coaxial to the centrally disposed conductor 7, is connected to the structure 3. The connection of the conductors 7, 8 with the structures 2, 3 can be made through the use of welding or brazing.

Ends of the conductors 7, 8 which protrude from the honeycomb body 1 are conically constructed. A corresponding non-illustrated connection adapter has conically constructed sockets corresponding to the conical ends of the conductors 7, 8, thereby creating a reliable electrical contact between the conductors 7, 8 and a corresponding coaxial connecting cable. In order to fasten the connecting cable, the sheath 6 is provided with an external thread 11 on which a nut can be screwed.

We claim:

1. In an internal combustion engine exhaust system having a metal shell, an electrically insulating gas-tight penetration passing through the shell at a given region, the penetration comprising:

a sheath passing through the shell in the given region; and at least two mutually coaxial electrical conductors extending through said sheath.

2. The penetration according to claim 1, wherein the metal shell is part of an electrically heatable catalytic converter.

3. The penetration according to claim 1, wherein said conductors are mutually concentric.

4. The penetration according to claim 1, wherein said sheath has ends, each of said conductors has a section extending out of at least one of said ends, said section of each of said conductors is partially electrically insulated, said conductors have an inside and an outside, and said section of each of said conductors has a shorter length at said outside than at said inside.

5. The penetration according to claim 1, including an insulating material formed of a compressed powder mixture of a material selected from the group consisting of MgO and $Al_2O_3$ for insulating said conductors.

6. The penetration according to claim 1, including front penetration surfaces, at least one of said front surfaces being gas-tightly sealed.

7. The penetration according to claim 6, including glass sealing material gas-tightly sealing said at least one of said front surfaces.

8. The penetration according to claim 6, including enamel sealing material gas-tightly sealing said at least one of said front surfaces.

9. The penetration according to claim 1, including plasma-injected $Al_2O_3$ insulating material for insulating said conductors.

10. The penetration according to claim 1, including a ceramic casting mass insulating material for insulating said conductors.

11. The penetration according to claim 1, wherein the given region of the shell is a region of low exhaust system temperature.

* * * * *